(12) United States Patent
Ashmead et al.

(10) Patent No.: US 11,300,225 B1
(45) Date of Patent: *Apr. 12, 2022

(54) VALVE-COUPLER ACTUATING SYSTEM

(71) Applicants: Edgar G. Ashmead, Lincoln University, PA (US); Chris Cullen, Bradford Woods, PA (US)

(72) Inventors: Edgar G. Ashmead, Lincoln University, PA (US); Chris Cullen, Bradford Woods, PA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/006,572

(22) Filed: Aug. 28, 2020

Related U.S. Application Data

(63) Continuation-in-part of application No. 16/256,922, filed on Jan. 24, 2019, now Pat. No. 10,760,708.

(60) Provisional application No. 62/621,046, filed on Jan. 24, 2018.

(51) Int. Cl.
| | |
|---|---|
| *F16K 31/524* | (2006.01) |
| *F16K 31/60* | (2006.01) |
| *F16K 15/20* | (2006.01) |
| *B60S 5/04* | (2006.01) |

(52) U.S. Cl.
CPC ............ *F16K 31/602* (2013.01); *B60S 5/043* (2013.01); *F16K 15/207* (2013.01)

(58) Field of Classification Search
CPC .... F16K 15/205; F16K 15/207; F16K 31/524; F16K 31/52408; F16K 31/602; Y10T 137/3584; Y10T 137/3724; Y10T 137/87981; Y10T 137/88046; B60S 5/04; B60S 5/043; F04B 33/005

USPC ............ 251/231, 259; 137/223, 231, 614.11, 137/614.19; 141/38
See application file for complete search history.

(56) References Cited

U.S. PATENT DOCUMENTS

| | | | |
|---|---|---|---|
| 5,878,774 A * | 3/1999 | Zanetti .................... | B60S 5/043 137/228 |
| 5,902,097 A | 5/1999 | Wu | |
| 6,035,885 A | 3/2000 | Schuessler, Jr. et al. | |
| 6,146,116 A | 11/2000 | Wu et al. | |
| 6,223,764 B1 | 5/2001 | Charlesbois et al. | |
| 6,615,704 B2 | 9/2003 | Chuang | |
| 6,676,042 B2 | 1/2004 | Howlett, Jr. et al. | |
| 6,843,270 B1 | 1/2005 | Wang | |
| 7,562,671 B2 | 7/2009 | Wang | |
| 8,156,955 B2 | 4/2012 | Wang | |
| 8,424,555 B2 | 4/2013 | Wu | |
| 8,764,125 B2 | 7/2014 | Vezzoli et al. | |

(Continued)

*Primary Examiner* — Matthew W Jellett
(74) *Attorney, Agent, or Firm* — Invention To Patent Services; Alex Hobson (57) ABSTRACT

A valve-coupler system has a lever that extends under a length axis of the valve body to enable one-handed operation. The valve-coupler body has an opening that is configured over a valve stem and a seal actuator having a lever that can be rotated about a pivot with a single hand to create a seal around the valve stem. Additionally, a valve-coupler may have a gas inlet valve that can be activated by the same single hand to open the valve and allow gas to flow into the valve stem. The inlet valve may be configured in line with the lever whereby the inlet valve is opened when the lever is rotated about the pivot to contact the inlet valve. The inlet valve may be configured on the valve body for manipulation by a user's finger or thumb. The inlet valve may be on the top of the valve body.

17 Claims, 6 Drawing Sheets

(56) References Cited

U.S. PATENT DOCUMENTS

2004/0202546 A1    10/2004    Kayukawa et al.
2013/0236333 A1    9/2013    Wang

* cited by examiner

VALVE-COUPLER ACTUATING SYSTEM

CROSS REFERENCE TO RELATED APPLICATIONS

The application is a continuation in part of U.S. application Ser. No. 16/256,922, filed on Jan. 24, 2019, which claims the benefit of U.S. provisional patent No. 62/621,046, filed on Jan. 24, 2018; the entirety of both applications are hereby incorporated by reference herein.

BACKGROUND OF THE INVENTION

Field of the Invention

The invention relates to a valve-coupler system that enables one-hand operation including coupling to and sealing to a valve stem.

Background

Attaching a valve-coupler to a valve stem takes two hands, one to press and hold the valve-coupler over the valve stem and one to actuate a lever to produce a seal with the valve stem. This operation requiring two hands is cumbersome. For example, when coupling a valve-coupler to a bicycle tire, one hand may be required for holding the tire or the bicycle, thereby making it difficult to secure the valve coupler to the valve stem.

SUMMARY OF THE INVENTION

The invention is directed to a valve-coupler system comprising a valve body and a seal actuator that incorporates a lever for one-hand operation. The lever extends below the valve body from a rocker end to a handle end. The handle end is proximal to the inlet end of the valve body and the rocker end is proximal to the valve-coupler opening in the valve body for attachment over a valve stem. The valve-coupler opening, or opening as used herein, is configured substantially orthogonally to the length axis of the valve coupler body, such as within about 70 to 110 degrees from the length axis. This unique configuration of the lever and valve-coupler opening enables attachment and sealing of the valve-coupler to a valve stem with one hand. A seal actuator may be configured with a valve lever that extends from the valve end of the valve-coupler to enable quick detachment of the seal actuator from the valve and release of the valve-coupler from the seal. A valve lever may extend through the valve body and extend along a length axis of the valve-coupler out of the valve end.

In an exemplary embodiment, a gas inlet valve is configured along the gas conduit extending through the valve coupler body from the inlet end to the opening for placement over a valve stem. An exemplary gas inlet valve, such as a lever or body-valve, enables opening of said valve by simple pressing on the valve actuator. A body-valve may be configured on the top or side of the valve body to allow pressing and opening of the body-valve with the same hand that is used to located and seal the valve-coupler to a valve stem. One hand may be used to squeeze the lever to actuate the seal around the valve stem and the thumb may be used to press the body-valve to allow compressed air to flow through the gas conduit, through the valve stem and into a receiving body, such as an inflatable body. A lever-valve is configured on the valve body in a location such that the lever will actuate the lever-valve when rotated past a sealing angle. A lever-valve may be configured on the bottom of the valve body, below the length axis of the valve body, for example. A user may use one hand to locate the opening of the valve body over the valve-stem and then squeeze the lever to actuate the seal around the valve stem. The user may then squeeze the lever further to actuate the lever-valve to allow compressed gas to flow through the gas conduit, through the valve stem and into the receiving body. When the user has filled the receiving body with a desired amount of gas, the lever can be released to rotate it back to close the lever-valve. The lever can be rotated further back to release the seal from around the valve stem to allow removal of the valve-coupler from the valve stem.

The exemplary valve-coupler of the present invention can also be used with pumps, such as hand pumps, wherein no additional valve along the gas conduit is required. The gas conduit may extend through the valve body with no valve to block the flow of gas through the gas conduit. In an exemplary embodiment, a gas inlet valve, may have an actuation mechanism or actuator that does not require continuous pressure to be applied, such as a lever or knob for example. A user may open the gas inlet valve such as by manipulating the actuator to open the gas inlet valve. The user may then inflate a receiving body with a pump, such as a hand or floor pump.

A receiving body is any reservoir for receiving air through the valve-coupler and may be a tank that is rigid or an inflatable body, such as a tire that inflates with air or gas received through the exemplary valve-coupler as described herein. Any suitable gas may be passed through the valve-couple and into a receiving body including air, noble gases such as argon, or nitrogen that is commonly used for tire inflation, hydrocarbons such as natural gas, methane or butane and the like.

A valve stem may be any suitable type of valve stem for receiving gas into a receiving body. In an exemplary embodiment, the valve-coupler is configured to seal around a Presta valve (also called Sclaverand valve or French valve). A Presta valve is a valve commonly found in high pressure road style and some mountain bicycle inner tubes. It comprises an outer valve stem and an inner valve body. A Presta valve also has a small screw and captive nut on the top of the valve body that permits the valve to be screwed shut and ensure that it remains tightly closed. The nut must be unscrewed to permit airflow in either direction. A Presta valve requires a greater pressure from the valve-coupler to open the valve within the Presta valve to allow gas to flow into the Presta valve. An exemplary valve-coupler may be configured to seal to Schrader valve, having a pin that must be pressed to open the valve to allow air flow into the Schrader valve. An exemplary seal actuator of a valve-coupler comprises a post for pressing on the pin of Schrader valve.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring to FIGS. 1 to 5, an exemplary valve-coupler actuating system 10 comprises a valve body 30, and a seal actuator 15. The seal actuator comprises a lever 50 configured for one-hand operation. The valve coupler 20 has a valve body 30 that extends a length along a length axis 21 from and inlet end 22 to a valve end 24. A gas conduit 34 extends from the inlet end to the valve-coupler opening 32 configured to fit over a valve stem 80. The lever extends below the valve body 30 from the rocker end 52 to the handle end 54, along the lever axis 51 that extends through the pivot 56.

Figure 3:
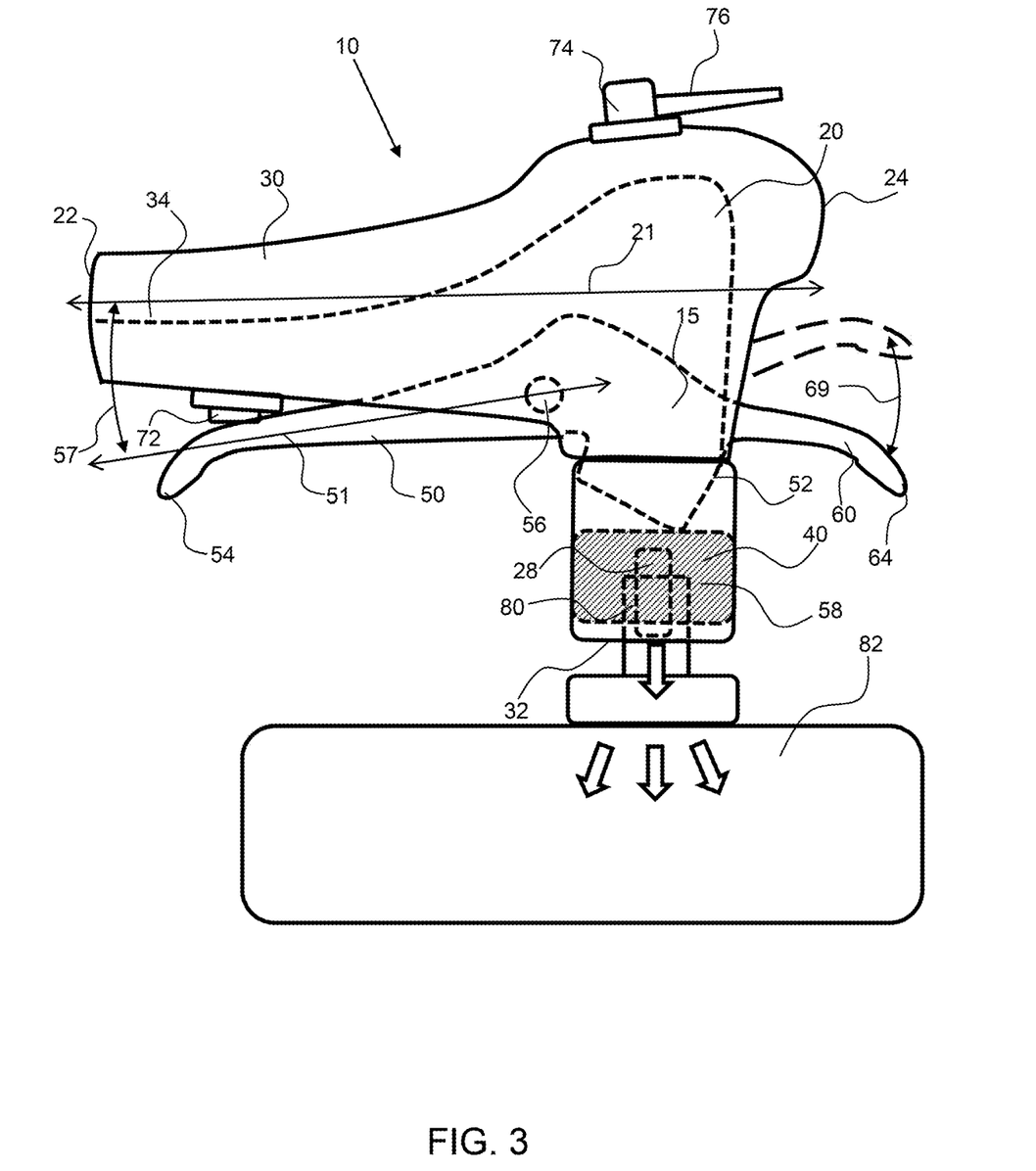
FIG. 3 shows a side view of an exemplary valve-coupler actuating system coupled to a valve stem of a receiving body and the lever rotated to open the lever valve to allow a flow of gas through the valve coupler and into the receiving body.

A seal actuator may 15 may have a valve lever 60 that extends from the valve end 24 of the valve-coupler 20 to enable quick detachment of the seal actuator from the valve stem 80 and release of the valve-coupler from the valve stem. A valve lever may extend through the valve body 20 and extend along a length axis 21 of the valve-coupler out of the valve end. As shown in FIG. 3, the valve lever pivots a valve lever actuation arc 69 about the pivot 56.

Figure 1:
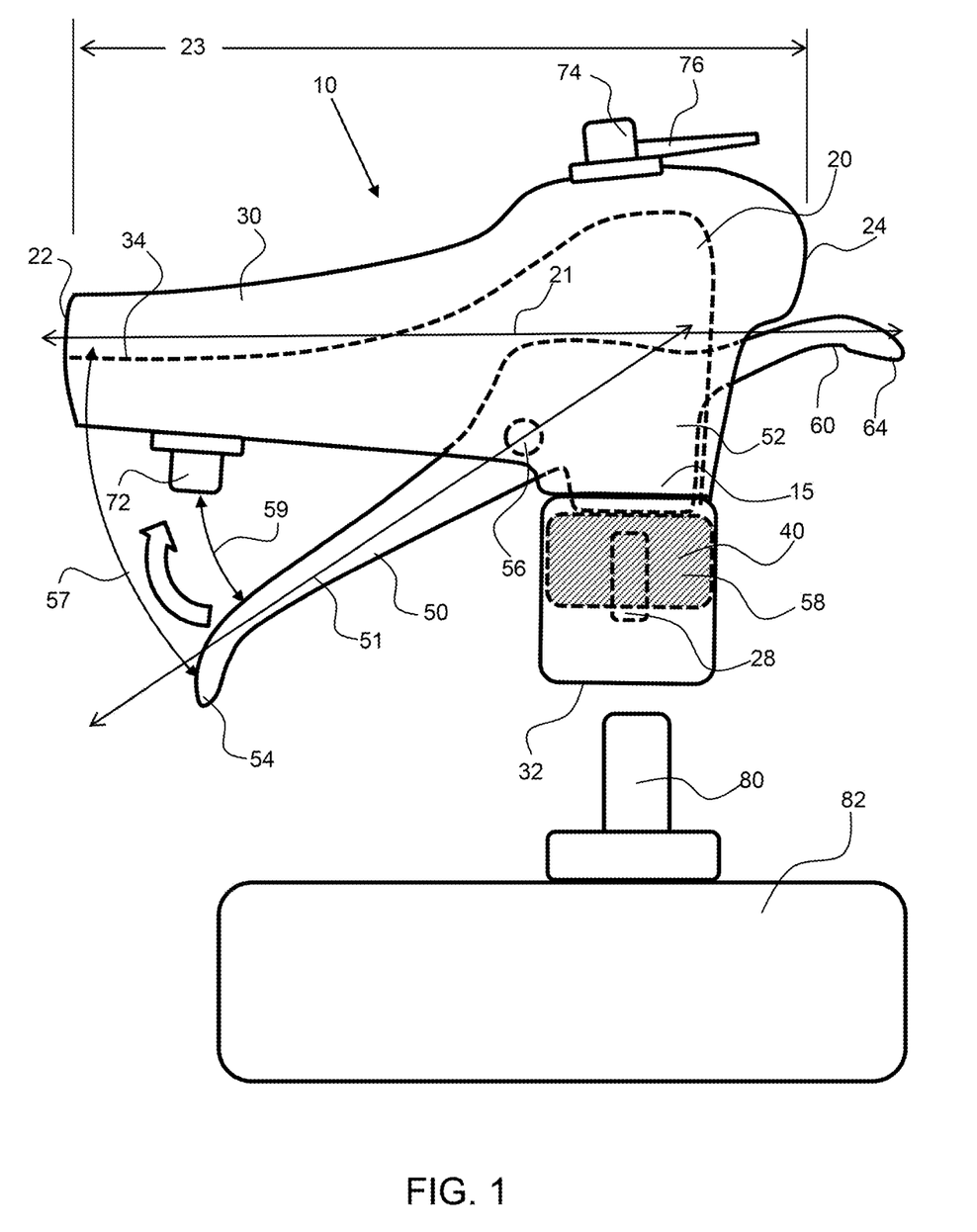
FIG. 1 shows a side view of an exemplary valve-coupler actuating system having a lever configured for one hand operation.

As shown in FIG. 1, the lever is in an open position with an angular offset distance 57 that is large. The lever actuation arc 59 is the distance the lever can move from an open position to a completely closed position. In a closed position, the lever may be in contact with the lever-valve 72 to open the valve to allow gas to flow through the valve-coupler and into the valve stem.

Figure 2:
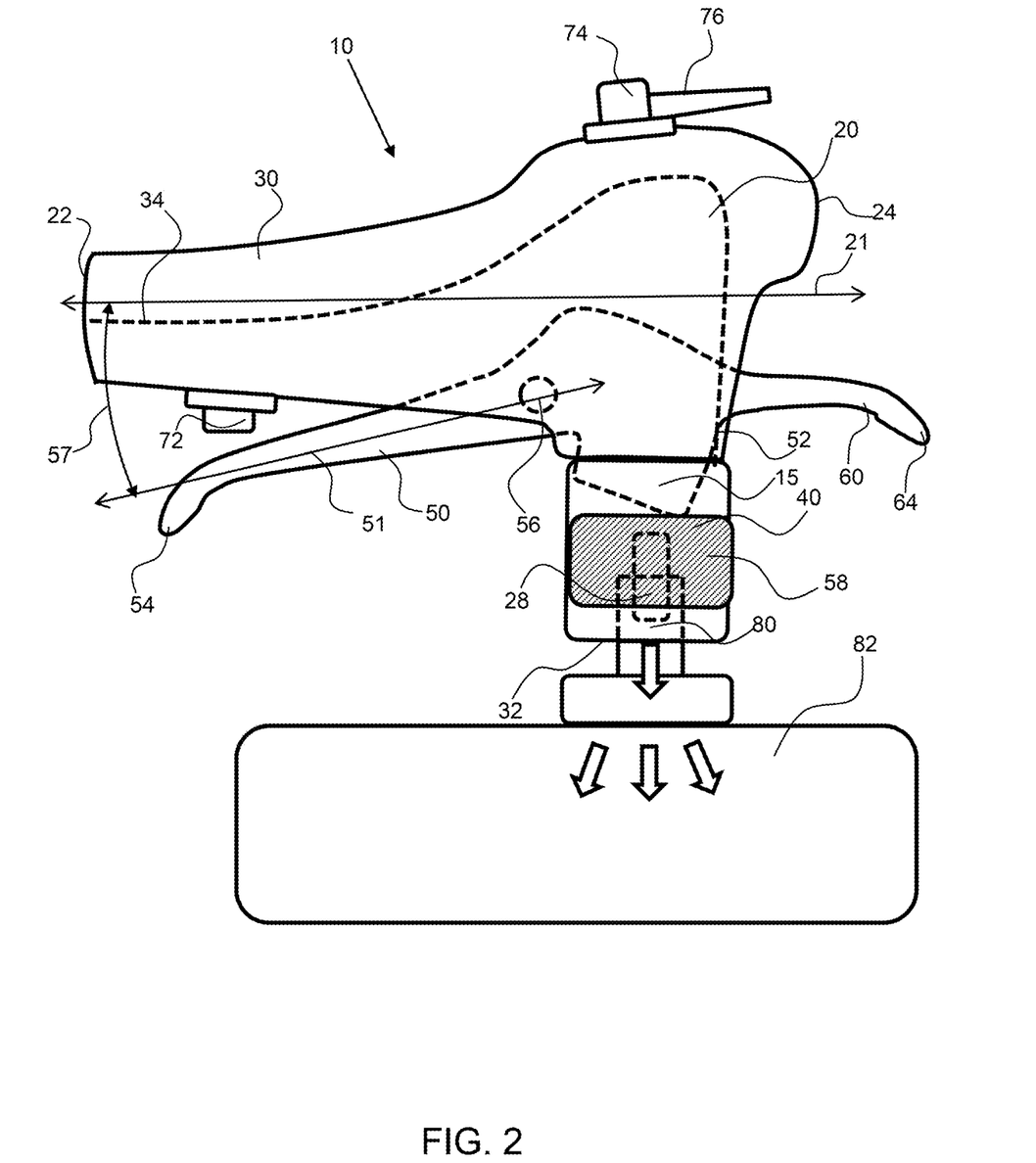
FIG. 2 shows a side view of an exemplary valve-coupler actuating system coupled to a valve stem of a receiving body.

As shown in FIG. 2, the handle end 54 of the lever is rotated about the pivot 56 to a seal position, wherein the seal 40 is pressed down over and around the valve stem. The movement of the lever about the lever actuation arc moves the plunger portion 58 of the lever to press and secure the seal 40 around a valve stem. The seal may be an elastomeric material having a cylindrical recess for receiving a valve stem 80.

As shown in FIG. 3, the lever is rotated further along the lever actuation arc to press on a gas inlet valve, a lever-valve 72. The angular offset distance 57 is further reduced from the open position shown in FIG. 1 and the seal position shown in FIG. 2. The lever-valve may be coupled with the gas conduit 34 and may require activation to allow a flow of gas through the gas conduit and into a receiving body 82.

Figure 4:
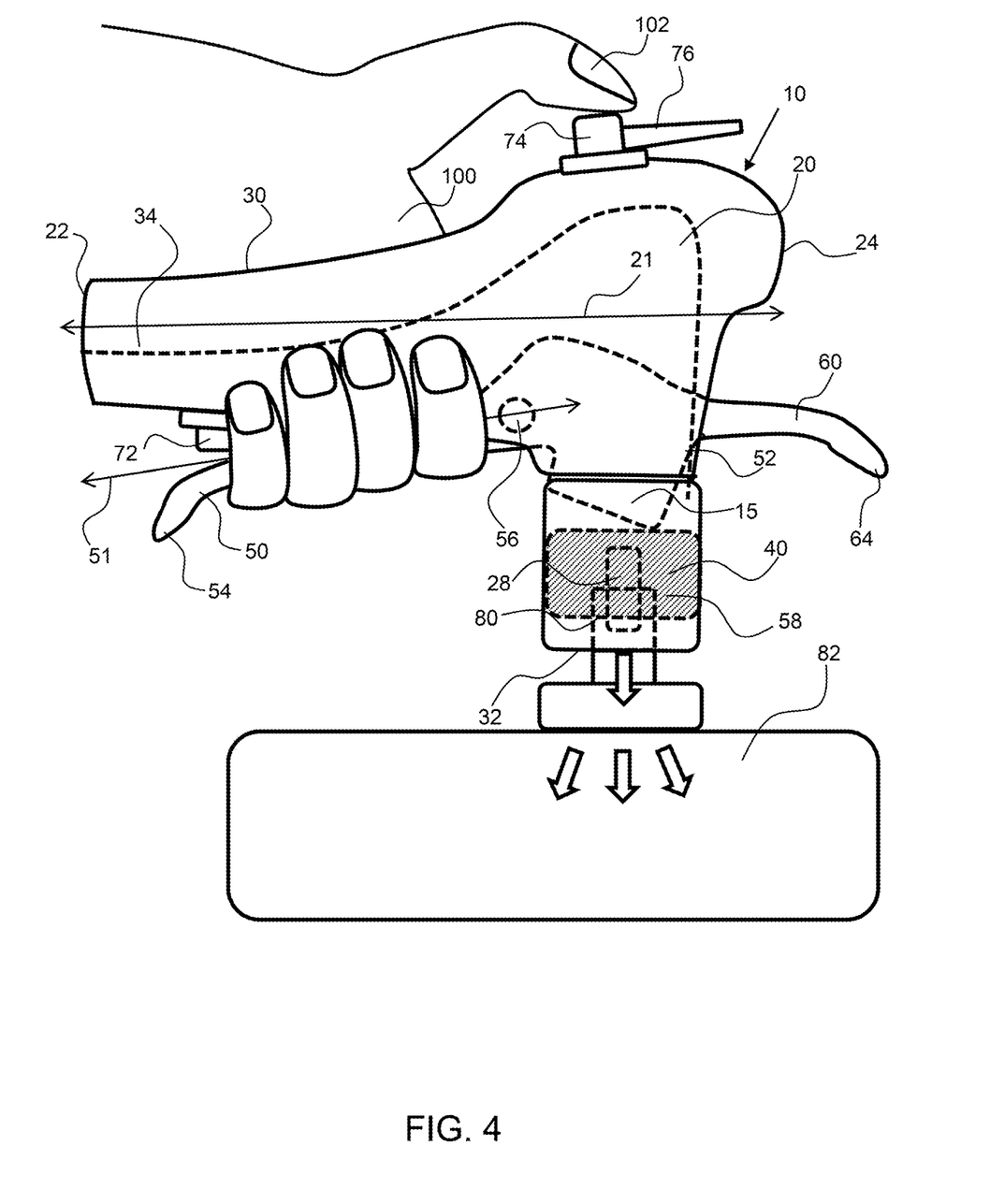
FIG. 4 shows a side view of an exemplary valve-coupler actuating system coupled to a valve stem of a receiving body and a person squeezing the lever to secure the seal around the valve stem and their thumb over the body-valve.
Figure 5:
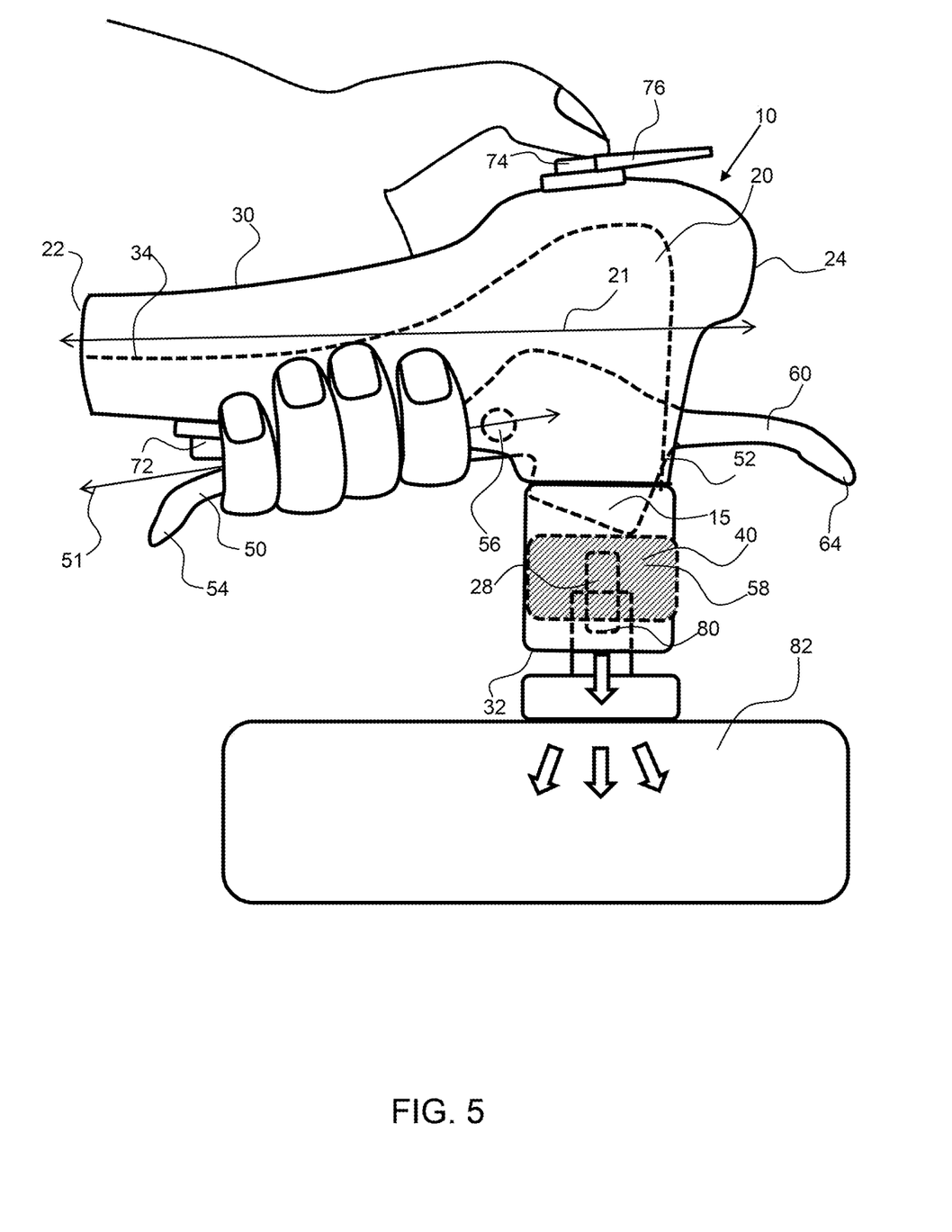
FIG. 5 shows a side view of an exemplary valve-coupler actuating system coupled to a valve stem of a receiving body and a person pressing a body-valve to with their thumb to open the body-valve to allow a flow of gas through the valve coupler and into the receiving body.

As shown in FIG. 4, an exemplary valve coupler 20 is coupled to a valve stem 80 with one hand 100 and a person has positioned their thumb 102 over a gas inlet valve, a body-valve 74. The lever is in a seal position, wherein a seal is made with the valve stem 80 but the lever-valve is not opened. As shown in FIG. 5, the body-valve is activated by pressing on the body-valve to allow a flow of compressed gas to flow through the gas conduit and into a receiving body 82. A gas inlet valve may be a self-closing valve, requiring pressure on the button or actuator to maintain the valve in an open state. A gas inlet valve may comprise an actuator 76, such as a lever or knob, that can be actuated to open or close the valve and does not require continual pressure on the valve to keep it open. The actuator of a gas inlet valve may be used when a pump, such as a manual pump, is used as the gas source instead of a compressed tank gas source, or compressor. It is to be noted that a gas inlet valve, such as the lever-valve or body-valve, may be required to be activated for a flow of gas to flow through the gas conduit and into a receiving body; such as when a hand pump is coupled with the valve coupler. An exemplary valve-coupler may comprise a gas conduit extending through the valve coupler without any additional gas inlet valves, for example. A valve-coupler may comprise a post 28 for opening a valve on a valve stem. The post may be coupled with the plunger portion and may move with the seal 40 when the lever 50 is rotated toward the length axis of the valve body.

Figures 6, 7:
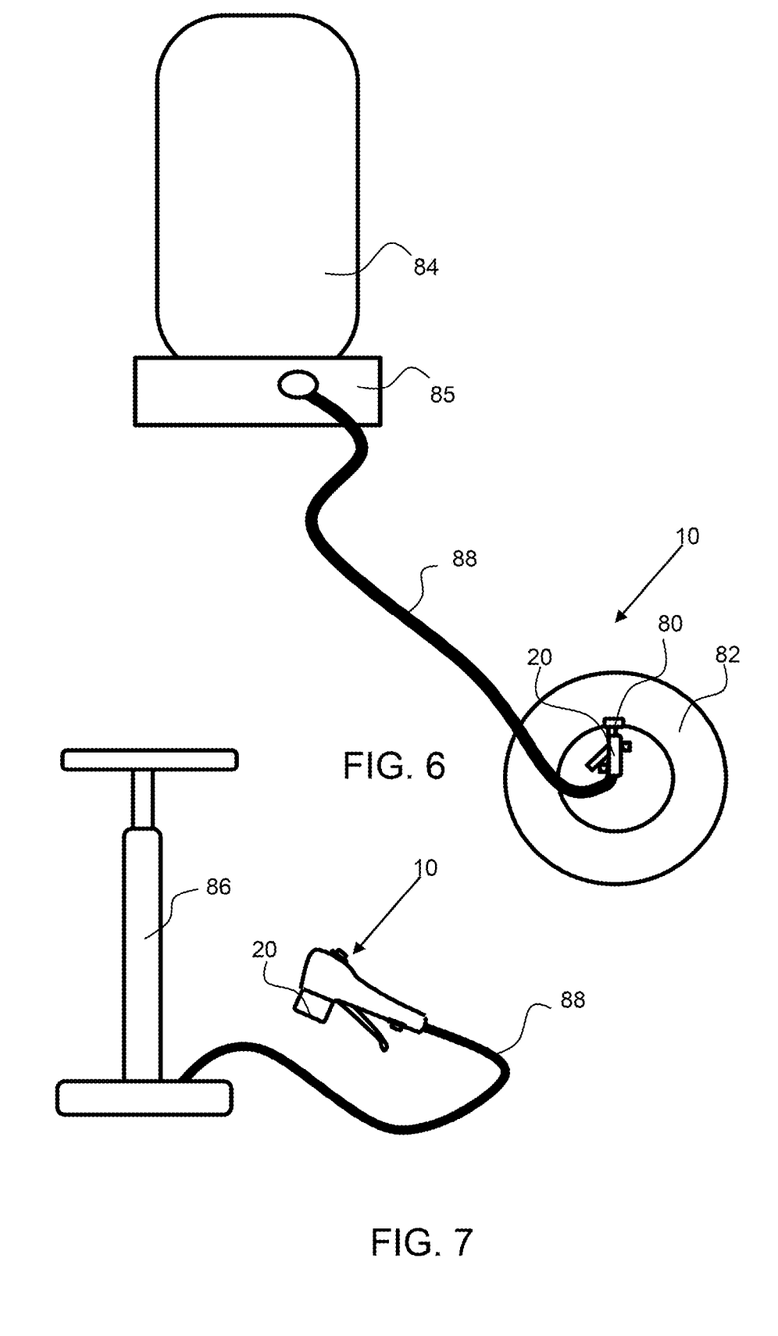
FIG. 6 shows an exemplary valve-coupler actuating system coupled with a compressed tank of gas with the valve coupler attached to the valve stem of a tire.
FIG. 7 shows an exemplary valve-coupler actuating system coupled with hand-pump.

As shown in FIG. 6, an exemplary valve-coupler actuating system 10 is coupled with a compressed gas tank 84 gas source. The valve coupler 20 is attached to the valve stem 80 of a receiving body 82, a tire. The compressed gas tank may be coupled with a compressor 85 and a gas line 88 may extend from the compressor or compressed gas tank to the valve coupler 20.

As shown in FIG. 7, an exemplary valve-coupler actuating system 10 is coupled with hand-pump 86 gas source. In this embodiment the gas is compressed by manual manipulation of the pump. As described herein, the valve-coupler 20 may comprise a gas inlet valve actuator to allow air from the pump to flow through the valve coupler or may not comprise a gas inlet valve, whereby gas may flow freely into and out of the valve coupler based on pressure differentials.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A valve-coupler actuating system comprising:
  a) a valve-coupler comprising:
    i) a valve body having a length axis that extends from an inlet end to a valve end;
    ii) a valve-coupler opening in the valve body configured on the valve end that is substantially orthogonal to the length axis and below the length axis;
    wherein the inlet end is configured to receive compressed gas from a gas source and wherein compressed gas flows from the inlet end to the valve-coupler opening;
  b) a seal on the valve end configured to fit around a valve stem;
  c) a seal actuator configured to compress the seal around a valve stem; the seal actuator comprising:
    i) a lever comprising:
      a rocker-end;
      a handle end;
      a length from the rocker end to the handle end;
      wherein the lever extends from the valve-coupler body to the handle end and wherein the handle end is more proximal to the inlet end of the valve body than the rocker end and wherein the handle end is below the length axis of the valve body;
    ii) a valve lever that is coupled with the seal actuator and extends from the valve end of the valve body;
    iii) a pivot coupled with the valve-coupler, the lever and with the valve lever, wherein the handle end of the lever rotates about said pivot a lever actuation arc, and wherein the handle end of the valve lever rotates about said pivot a valve lever actuation arc;
  wherein the rocker-end is coupled with the seal and compresses the seal to produce a gas-seal around said valve stem when the lever is rotated about the pivot from an open position, wherein the handle end is at an angular offset distance from the length axis of the valve body, to a closed position, wherein the handle end is rotated about the pivot up towards the length axis of the valve body to reduce the angular offset distance;
  wherein the gas-seal allows compressed gas to flow into the valve stem;
  wherein the valve-coupler is configured for location on a valve stem and sealing to said valve stem with one-hand, wherein the valve coupler opening is configured around said valve stem with one-hand and the lever of the seal actuator is actuated from an open position to closed position by a user's finger or fingers on said one-hand by squeezing the handle end of the lever toward the length axis of the valve body.

2. The valve-coupler actuating system of claim 1, wherein the compressed gas source is a hand pump.

3. The valve-coupler actuating system of claim 2, wherein the hand pump is portable.

4. The valve-coupler actuating system of claim 3, wherein the valve-coupler is a presta valve coupler configured to seal to a presta valve.

5. The valve-coupler actuating system of claim 3, wherein the valve-coupler is a Schrader valve coupler and wherein the seal actuator comprises a post coupled with the seal that is actuated by the rocker end of the lever to depress a valve pin of a Schrader valve stem.

6. The valve-coupler actuating system of claim 1, wherein the gas source is a compressed gas tank.

7. The valve coupler actuating system of claim 1, further comprising a gas inlet valve that when open allows compressed gas to flow from the gas source thorough the valve-coupler through a valve stem and into a receiving body.

8. The valve coupler actuating system of claim 7, wherein the gas inlet valve is a lever-valve coupled to the valve body and configured to be opened by contact with the lever when it is rotated up to reduce said angular offset distance.

9. The valve coupler actuating system of claim 8, wherein the lever valve is a self-closing valve that remains open only when pressure is applied to the valve.

10. The valve coupler actuating system of claim 9, wherein the lever-valve is configured on the valve body below the centerline and in-line with the lever actuation arc.

11. The valve coupler actuating system of claim 10, wherein the lever has a first angular offset distance that seals the seal around a valve stem and a second and smaller angular offset distance that opens the lever-valve.

12. The valve coupler actuating system of claim 7, wherein the gas inlet valve is a body-valve coupled to the valve body.

13. The valve coupler actuating system of claim 12, wherein the body-valve is a self-closing valve that remains open only when pressure is applied to the valve.

14. The valve coupler actuating system of claim 13, wherein the body-valve is configured above the length axis of the valve body and configured for manipulation with a user thumb while holding the lever with said user's hand.

15. The valve coupler actuating system of claim 12, wherein the body-valve comprises an actuator to open and keep the body-valve in an open state.

16. A valve-coupler actuating system comprising:
  a) a valve-coupler comprising:
    i) a valve body having a length axis that extends from an inlet end to a valve end;
    ii) a valve-coupler opening in the valve body configured on the valve end that is substantially orthogonal to the length axis and below the length axis;
    wherein the inlet end is configured to receive compressed gas from a gas source and wherein compressed gas flows from the inlet end to the valve-coupler opening;
  b) a seal on the valve end configured to fit around a valve stem;
  c) a seal actuator configured to compress the seal around a valve stem; the seal actuator comprising:
    i) a lever comprising:
      a rocker-end;
      a handle end;
      a length from the rocker end to the handle end;

wherein the lever extends from the valve-coupler body to the handle end and wherein the handle end is more proximal to the inlet end of the valve body than the rocker end and wherein the handle end is below the length axis of the valve body ii) a valve lever that is coupled with the seal actuator and extends from the valve end of the valve body;

iii) a pivot coupled with the valve-coupler, the lever and with the valve lever, wherein the handle end of the lever rotates about said pivot a lever actuation arc, and wherein the handle end of the valve lever rotates about said pivot a valve lever actuation arc;

wherein the rocker-end is coupled with the seal and compresses the seal to produce a gas-seal around said valve stem when the lever is rotated about the pivot from an open position, wherein the handle end is at an angular offset distance from the length axis of the valve body, to a closed position, wherein the handle end is rotated about the pivot up towards the length axis of the valve body to reduce the angular offset distance;

wherein the gas-seal allows compressed gas to flow into the valve stem;

wherein the valve-coupler is configured for location on a valve stem and sealing to said valve stem with one-hand, wherein the valve coupler opening is configured around said valve stem with one-hand and the lever of the seal actuator is actuated from an open position to closed position by a user's finger or fingers on said one-hand by squeezing the handle end of the lever toward the length axis of the valve body;

d) a lever-valve coupled to the valve body and configured to be opened by contact with the lever when it is rotated up to reduce said angular offset distance;

wherein the lever valve is a self-closing valve that remains open only when pressure is applied to the valve;

wherein the lever-valve is configured on the valve body below the centerline and in-line with the lever actuation arc; and wherein the lever has a first angular offset distance that seals the seal around a valve stem and a second and smaller angular offset distance that opens the lever-valve.

17. A valve-coupler actuating system comprising:

a) a valve-coupler comprising:

i) a valve body having a length axis that extends from an inlet end to a valve end;

ii) a valve-coupler opening in the valve body configured on the valve end that is substantially orthogonal to the length axis and below the length axis;

wherein the inlet end is configured to receive compressed gas from a gas source and wherein compressed gas flows from the inlet end to the valve-coupler opening;

b) a seal on the valve end configured to fit around a valve stem;

c) a seal actuator configured to compress the seal around a valve stem; the seal actuator comprising:

i) a lever comprising:
a rocker-end;
a handle end;
a length from the rocker end to the handle end;

wherein the lever extends from the valve-coupler body to the handle end and wherein the handle end is more proximal to the inlet end of the valve body than the rocker end and wherein the handle end is below the length axis of the valve body ii) a valve lever that is coupled with the seal actuator and extends from the valve end of the valve body;

iii) a pivot coupled with the valve-coupler, the lever and with the valve lever, wherein the handle end of the lever rotates about said pivot a lever actuation arc, and wherein the handle end of the valve lever rotates about said pivot a valve lever actuation arc;

wherein the rocker-end is coupled with the seal and compresses the seal to produce a gas-seal around said valve stem when the lever is rotated about the pivot from an open position, wherein the handle end is at an angular offset distance from the length axis of the valve body, to a closed position, wherein the handle end is rotated about the pivot up towards the length axis of the valve body to reduce the angular offset distance;

wherein the gas-seal allows compressed gas to flow into the valve stem;

wherein the valve-coupler is configured for location on a valve stem and sealing to said valve stem with one-hand, wherein the valve coupler opening is configured around said valve stem with one-hand and the lever of the seal actuator is actuated from an open position to closed position by a user's finger or fingers on said one-hand by squeezing the handle end of the lever toward the length axis of the valve body;

d) a body-valve coupled to the valve body;

wherein the body-valve is a self-closing valve that remains open only when pressure is applied to the valve;

wherein the body-valve is configured above the length axis of the valve body and configured for manipulation with a user thumb while holding the lever with said user's hand.

* * * * *